US005666852A

United States Patent [19]

Musschoot

[11] Patent Number: 5,666,852

[45] Date of Patent: Sep. 16, 1997

[54] JOINTED WEIGHT FOR A VIBRATORY APPARATUS

[75] Inventor: Albert Musschoot, Barrington, Ill.

[73] Assignee: General Kinematics Corporation, Barrington, Ill.

[21] Appl. No.: 387,349

[22] Filed: Feb. 13, 1995

[51] Int. Cl.[6] .............. F16H 33/14

[52] U.S. Cl. .............. 74/87; 74/61; 198/770; 209/366.5; 366/128

[58] Field of Search .............. 74/61, 87, 84 R, 74/84 S; 198/770; 209/366.5, 367, 325, 326, 332; 366/128; 404/117

[56] References Cited

U.S. PATENT DOCUMENTS

| | | | |
|---|---|---|---|
| 2,418,982 | 4/1947 | O'Connor | 74/87 X |
| 2,636,719 | 4/1953 | O'Connor | 198/770 X |
| 3,407,670 | 10/1968 | Venanzetti | 366/128 X |
| 4,025,419 | 5/1977 | Musschoot | 209/3 |
| 4,580,456 | 4/1986 | Takano | 366/128 X |

OTHER PUBLICATIONS

Marks' Standard Handbook for Mechanical Engineers, 8th Ed., ©1978, pp. 5–72, Figures 11 & 12.

*Primary Examiner*—Charles A. Marmor
*Assistant Examiner*—David M. Fenstermacher
*Attorney, Agent, or Firm*—Wood, Phillips, VanSanten, Clark & Mortimer

[57] ABSTRACT

A counterweight is freely pivoted on a rotatably driven unbalanced eccentric weight member such that at start up the counterweight does not add materially to the unbalance created by the eccentric weight member and such that as the motor attains operating speed the freely pivoted counterweight is slung outward relative to the eccentric weight member thus adding unbalance to the eccentric weight member and increasing the vibratory forces generated by the apparatus.

6 Claims, 3 Drawing Sheets

JOINTED WEIGHT FOR A VIBRATORY APPARATUS

BACKGROUND OF THE INVENTION

Vibratory conveying, feeding, screening and the like systems have been driven by different vibratory generating apparatus and have been used in many different industries for many years. A typical vibratory generating apparatus was shown and described in my U.S. Pat. No. 4,025,419, where electric motors drive eccentric weights for producing vibrational forces for a sand reclaiming apparatus. The eccentric weights are fixed relative to the axis of the motor so that an unusually heavy unbalanced load is placed on the motors at start up.

Improved variable rate vibratory generating apparatus were subsequently developed and patented as shown in my U.S. Pat. Nos. 3,358,815 and 4,495,826. In the '815 patent, an apparatus is provided where at start up the unbalanced weight is close to the center of rotation (short radius arm) so that the load on the motor is minimized. As the motor builds up speed, the apparatus provides for moving the weight outward (increases the radius arm) relative to the center of rotation thereby increasing the unbalance and thus increasing the amplitude of vibration. The '815 structure permitted varying the amplitude of vibration to the most desired and most efficient setting.

U.S. Pat. No. '826 provides a structure where a fixed eccentric weight is balanced by a movable eccentric weight so that at start up little or no unbalance exists and, therefore, there are little or no vibratory forces generated. When the motor, which may or may not be a variable speed type, reaches the desired speed, the movable eccentric weight is moved to a desired position to create the desired degree of unbalance and the desired vibratory forces for the associated equipment.

Each of the prior or existing systems has shortcomings. Apparatus like U.S. Pat. No. 4,025,419 each motor and eccentric has one amplitude of vibration which is non-variable and which placed heavy start up loads on the motor. Apparatus like U.S. Pat. Nos. 3,358,815 and 4,495,826 are more complicated to build and maintain and require external controls to increase the amplitude of vibration once the motor is up to speed, which of course placed less stress on the motor and consumes less power during start up.

SUMMARY OF THE PRESENT INVENTION

A structure is provided where a counterweight is freely pivoted on a rotatably driven unbalanced eccentric weight member such that at start up the counterweight does not add materially to the unbalance created by the eccentric and such that as the motor attains operating speed the freely pivoted counterweight is slung outward relative to the eccentric weight member thus adding unbalance to the eccentric weight member and increasing the vibratory forces generated by the apparatus.

When the eccentric with counterweight is used with a variable speed motor the ultimate vibratory forces are generated at each selected speed while allowing the use of minimum electricity or power at start up. When the eccentric with counterweight is used with a constant speed motor which is operably connected through appropriate means to the work member, the motor operates at a constant speed to produce increased vibratory forces on the trough.

DESCRIPTION OF ONE PREFERRED EMBODIMENT

Figure 2:
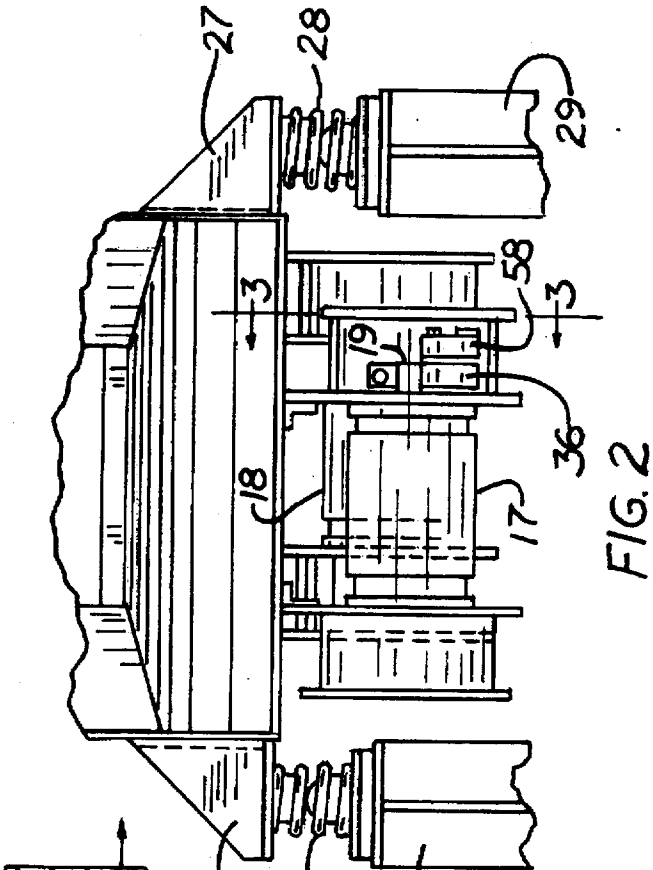
FIG. 2 is a partial view taken along the line 2—2 of FIG. 1 with same parts broken away to show an internal structure.

While this invention is susceptible of embodiment in many different forms, there is shown in the drawings and will herein be described in detail one illustrated embodiment, with the understanding that the present disclosure is to be considered as an exemplification of the principles of the invention and is not intended to limit the invention to the embodiment illustrated. The scope of the invention will be pointed out in the appended claims.

Figure 1:
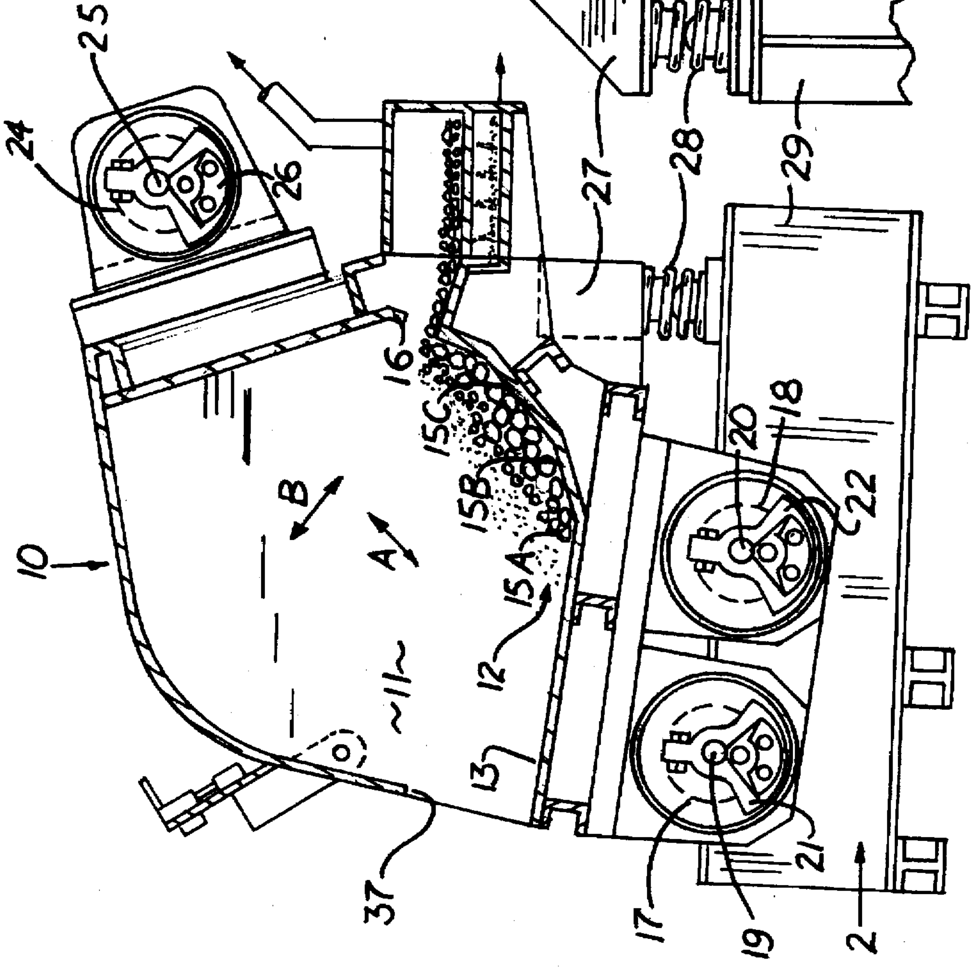
FIG. 1 is a side elevational view of a vibratory sand reclaiming apparatus embodying the invention.

FIGS. 1 and 2 are views similar to the vibratory sand reclaiming machine shown and described in my U.S. Pat. No. 4,025,419 only modified to include my improved counterweighted vibratory generating apparatus. Details of the structure and operation of the sand reclaiming machine is fully described in my U.S. Pat. No. 4,025,419 which broadly includes a housing 10 enclosing a chamber 11 with an entrance 37 and a floor 12 having a slanting downward first portion 13 and slanting upward portions 15A, 15B, 15C to an exit or discharge 16.

Secured to the underside of the housing 10 is a pair of electric motors 17 and 18 provided with shafts 19 and 20 respectively, with each shaft carrying a pair of my improved counterweighted eccentric vibratory exciter members at each end, the counterweight eccentric vibratory-exciter members at one end being shown at 21 and 22 and will be described in detail hereinafter. The housing 10 carries a third electric motor 24 positioned near the upper portion of the housing with the motor having a shaft 25 carrying my improved counterweighted eccentric vibratory exciter member at each end, one of which is shown at 26.

The housing 10 is mounted for vibratory movement by means of brackets 27 which are supported on springs 28 carried by base member 29.

Although exciter members 21, 22, 26 are shown in FIG. 1, it is understood that some applications require only one exciter member and, for the purpose of describing the invention, only one exciter member 21 will be described.

Figure 4:
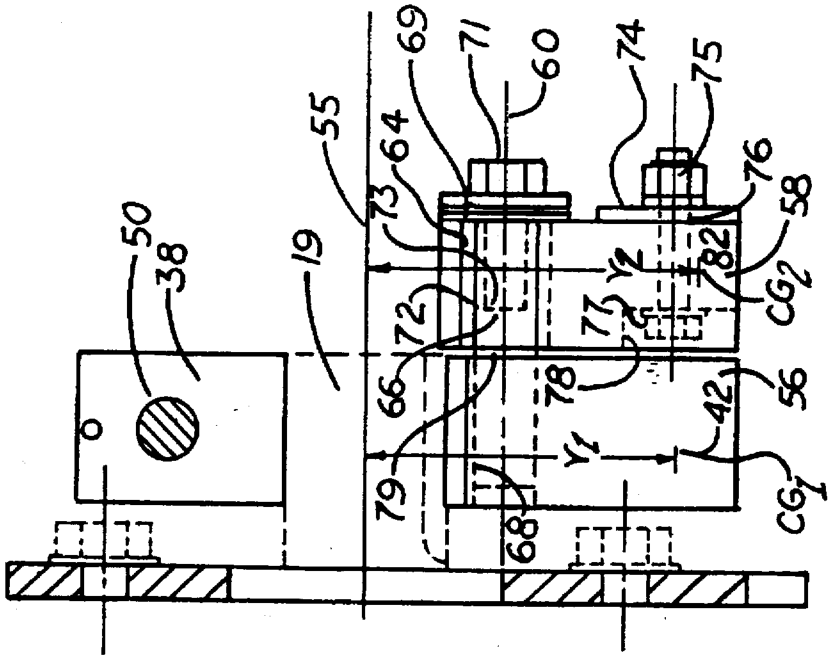
FIG. 4 is a cross-sectional view taken along the line 4—4 of FIG. 3.
Figure 3:
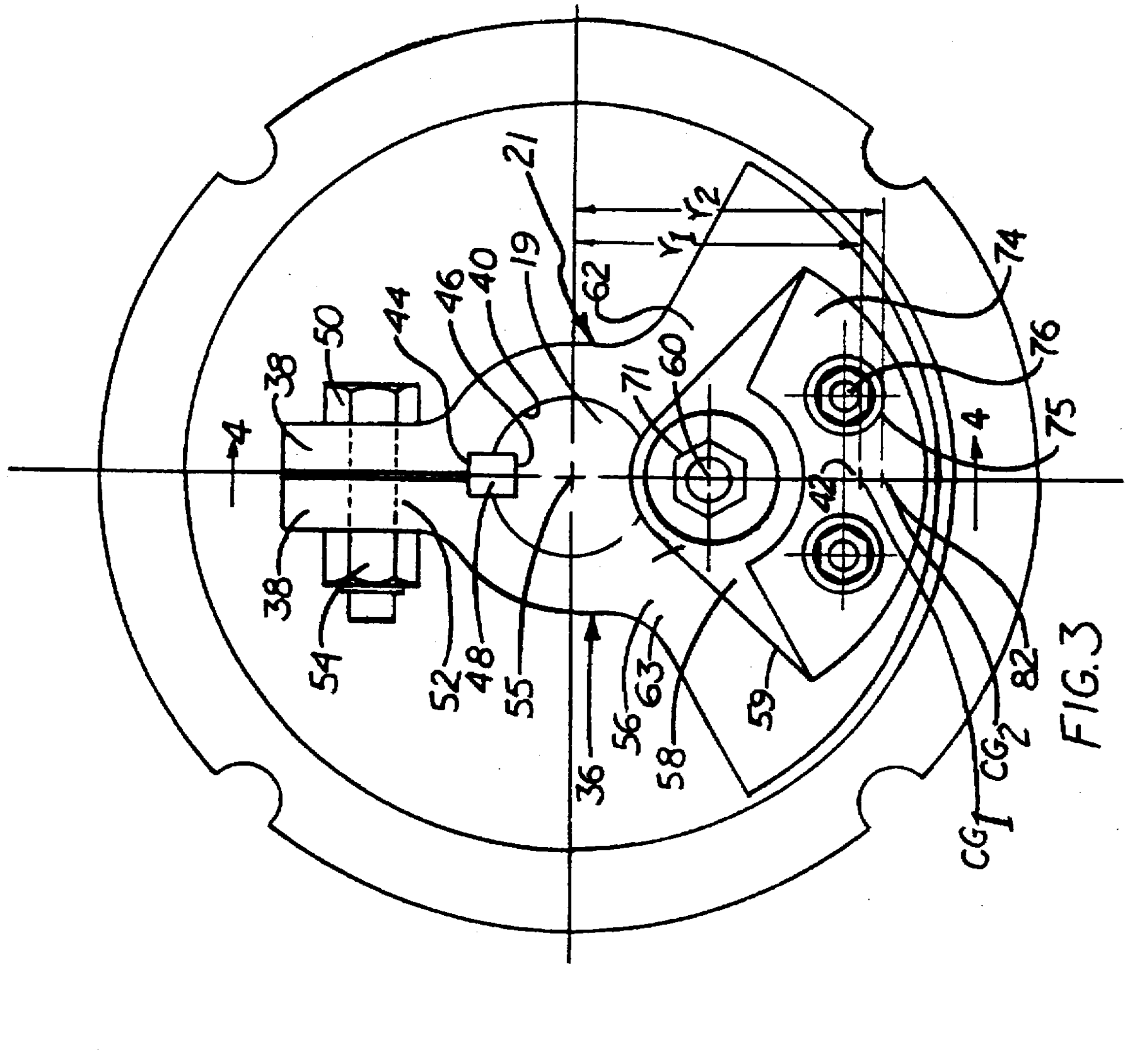
FIG. 3 is an enlarged partial end view taken along the line 3—3 of FIG. 2.

FIGS. 3 and 4 show enlarged details of the structure of one of my improved vibratory exciter members, for instance, member 21, and includes an unbalanced weight member or eccentric 36 which has a split mounting portion 38 communicating with an aperture 40 surrounding the keyed shaft 19 of the motor 17. A keyway 44 split between the two halves of the mounting portion 38 aligns with a keyway 46 in the shaft. A key 48 is wedged in the aligned keyways 44 and 46 so that when a bolt 50 passing through aligned openings 52 in the split mounting portion 38 and tightened by means of a nut 54 on the bolt 50 locks the eccentric 36 to the shaft 19 for positive rotation about the longitudinal axis 55 of the motor 17 and shaft 19. The eccentric 36 has an enlarged shaped weighted portion 56 with a center of gravity $CG_1$ at point 42 spaced a distance $r_1$ from the longitudinal axis 55 of the shaft and positioned diametrically opposite the split mounting portion 38. Under prior operating conditions, the unbalanced weight member would provide the vibratory motion desired upon operation of the motor. Upon start up, the motor would draw heavily and labor to get started and to attain speed and to drive the eccentric weight member to produce the vibratory action desired.

It is my improvement that a counterweight 58 is freely pivotally mounted about an axis 60 which axis is transverse to one face 62 of the enlarged portion 56 of the weight member 36 and is parallel to the axis 55 of the shaft 19. That is, counterweight 58 is illustrated as having an enlarged shaped portion 59 and as having an aperture 64 through a converging portion 65 of the counterweight shaped member. A pivot pin 66 is fixed in an aperture 68 in a narrow part 63 of the enlarged portion 56 of the eccentric weight member 36 near the aperture 40 and shaft 19 and extends outward transverse to the face 62 of the eccentric. The counterweight 58 has a bushing 72 seated in aperture 64 and surrounding the pivot pin 66 extending from the eccentric 36 so as to provide a free pivotal mounting for the counterweight 58 about axis 60 of the pivot pin 66. A headed bolt 71 is threaded into an aperture 73 formed longitudinally into the end of the pivot pin 66 to secure a bearing washer 69 between the head of the bolt 71 and the counterweight to retain the counterweight on the pin and to permit free pivoting of the counterweight about the pin 66 relative to the eccentric weighted member 36. One or more crescent-shaped weights 74 can be secured as by nuts 75 and bolts 76 to the enlarged shaped portion or outer radial pan of the counterweight to add more unbalance to the counterweight. The heads 77 of the bolts 76 are set in recesses 78 in the back of the counterweight so as not to interfere with the free pivoting of the counterweight about the axis 60 of the pivot pin 66. A washer 79 surrounds the pivot pin 66 between the face 62 of the narrow pan 63 of the eccentric weight 36 and the counterweight, once again, to encourage free pivoting of the counterweight 58 relative to the eccentric 36.

A plane containing axis 60 of the pivot 66 and axis 55 of shaft 19 also contains point 42 defining the location of the center of gravity $CG_1$ of the eccentric weight member 36 and the line defining the radius $R_1$ extending from axis 55 to point 42. When the apparatus is inoperative and gravity has taken over with respect to the eccentric weight member 36 and the counterweight 58, a point 82 defining the location of the center of gravity $CG_2$ of the counterweight also lies in said plane with the radius $R_2$ from the axis 55 of the shaft 42 to the point 82 center of gravity $CG_2$ of the counterweight also lying in said plane.

Figure 5:
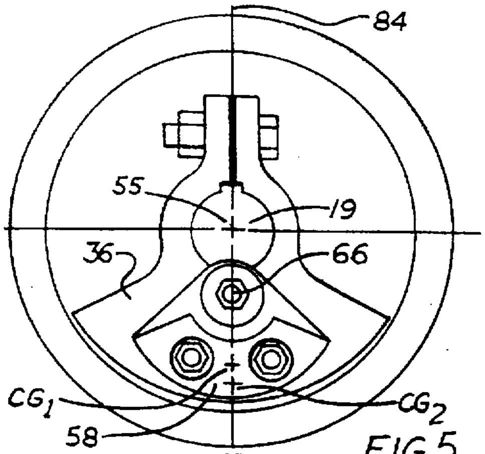
FIG. 5 is a view similar to FIG. 3 only reduced in size.

FIGS. 5–9, which show the relative positions of the counterweight 58 relative to the eccentric weight member 36 at various transitory operating conditions of the vibratory system, will now be described. FIG. 5 shows the eccentric 36 at motor stand still just prior to start up such that the weighted portion 56 of the eccentric 36 hangs straight down and the counterweight 58 likewise has the weighted portion hanging straight down.

Figure 6:
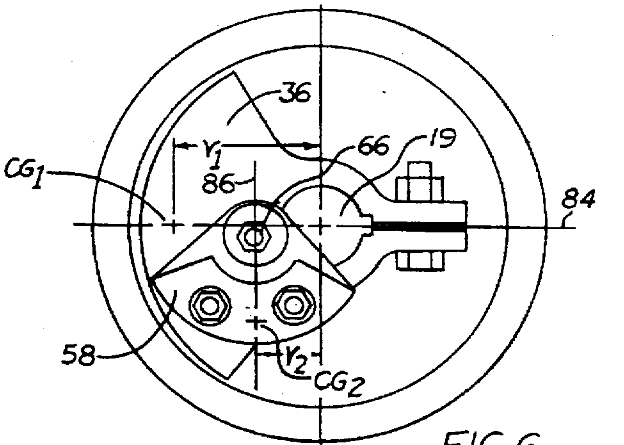
FIGS. 6,7, 8 and 9 are views similar to FIG. 5 only each one successively shows the eccentric and counterweight in a different operative position.
Figure 7:
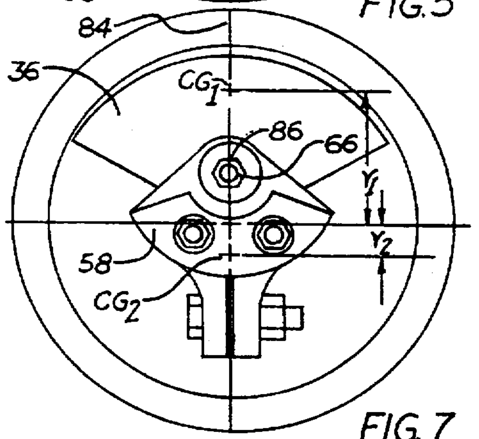

The motor is started and the shaft 19 and eccentric 36 are rotated clockwise, for instance, to an instantaneous position 90° from FIG. 5 to the position of FIG. 6 where the counterweight 58 has its center of gravity $CG_2$ hanging down from its pivot 66 as the centerline 84 of the eccentric 36 is now transverse to the centerline 86 of the counterweight 58. The effective weight of the combined eccentric member 36 and counterweight 58 has a center of gravity CG somewhere between the center of gravity $CG_1$ of the eccentric member 36 and the pivot axis 66 of the counterweight so that the radius of the center of gravity of the combined weight is less than the radius of the center of gravity of eccentric 36 so that less vibratory motion is generated and less power is needed to drive the apparatus as it passes the position of FIG. 6. As the shaft 19 and eccentric 36 continue to be driven clockwise, the instantaneous position of FIG. 7 is passed where the center of gravity $CG_2$ of the counterweight on its centerline 86 is hanging down from its pivot 66 such that the centerline 66 of the counterweight 58 and the centerline 84 of eccentric 36 coincide, and the weight of the counterweight is reducing the effective unbalanced weight of the eccentric, thereby producing less vibratory motion and reducing the load on the motor.

Figure 8:
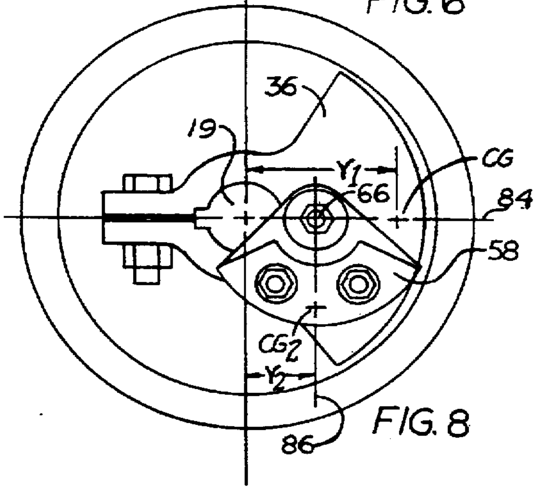

As the shaft 19 and eccentric 36 continue to be driven clockwise, the instantaneous position of FIG. 8 is passed with the center of gravity $CG_2$ of the counterweight hanging down such that the centerline 86 of the counterweight 58 is transverse to the centerline 84 of the eccentric.

The freely pivoted counterweight 58 acts, relative to the eccentric 36 as the eccentric is rotating, like the passenger buckets on a ferris wheel hanging freely from pivot 66. The effect of the hanging counterweight 58 is to reduce the effective unbalanced load of the eccentric 36 thereby reducing start up load on the motor. The resultant force couple created at each instantaneous position of the eccentric and counterweight with a reduced radial arm for the combined weight of the eccentric and counterweight lowers the load needed to drive the shaft, eccentric and counterweight.

Figure 9:
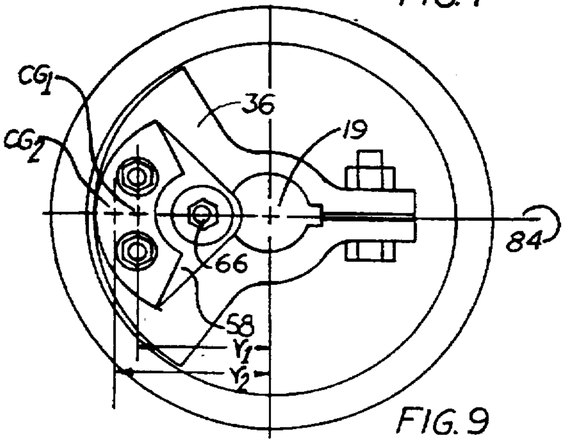

As the speed of the motor and shaft increases the centrifugal force on the weight of the counterweight will pivot the counterweight about pivot pin 66 with the weight $W_2$ acting through the center of gravity $CG_2$ thrown radially outward relative to the shaft 19 and pivot 66 to the position of FIG. 9, thereby adding unbalance to the eccentric 36. In this way an increased vibratory force is generated at operating speeds. A lower drain on power is needed at start up of the motor and apparatus and until operating speeds are attained due in part to the shorter effective radial arm operating on the combined weights of the eccentric and counterweight. The total unbalanced force $W_tR$ is equal to $W_1$ (eccentric weight 36) times $r_1$ (radial arm from center of shaft 19 to the center of gravity $CG_1$ of the eccentric) plus $W_2$ (weight of the counterweight 58) times $r_2$ (radial arm from the center of the shaft 19 to the center of gravity $CG_2$ of the counterweight). A greater vibratory force can be generated without increasing the size of the unbalanced eccentric weight 36 while using less power to start the rotation of the eccentric and to bring the apparatus up to operating speed.

The apparatus can be applied to all forms of conveying, screening, vibratory cleaning and the like wherever vibratory motion is used as the moving factor.

In operation in the sand reclaiming machine 10 lumps of sand and binder and any included material coming from a mold into which a casting has been poured, set and removed are introduced into the chamber 11 and the two motors 17 and 18 are started. The motors will drive the eccentrics 36 with counterweights 38, drawing less power to get started, until full speed and full vibratory motion is generated. The direction of the vibratory forces will be along the line designated by the arrow A in FIG. 1. The eccentrics and counterweight will agitate the sand clumps and binder until the clumps are reduced to ready to use molding sand. The sand will climb floor portions 15A, 15B and 15C and exit through discharge opening 16 as described in U.S. Pat. No. 4,025,419. Due to the increased unbalance caused by the counterweights 58 on eccentrics 36, the vibratory action is increased expediting the process of eliminating the clumps.

When the clumps are substantially eliminated, one motor, for instance motor 18, is shut off and motor 26 is started. Motors 17 and 26 with eccentrics 36 and counterweights 58 will change the direction of the vibratory forces to follow arrow B in FIG. 1 whereby sprews, rods, bars and the like from the casting box will be moved by the vibratory forces to climb sloping portion 13 of the floor and be discharged out the inlet opening 37.

The improved vibratory generating apparatus using eccentrics with the counterweights can be used wherever conventional vibratory generating apparatus has been used heretofore but an increased vibratory motion will be provided which will draw less power on start up and will produce an increased vibratory motion which will expedite the work being performed by the apparatus.

I claim:

1. Apparatus for increasing the vibratory force generated by a rotating mass comprising:

a shaft having a longitudinal axis and mounted rotation and said axis;

means for rotating said shaft about said axis;

an eccentric weight mounted rigidly on the shaft and having a center of gravity to one side of said axis; and a counterweight freely pivoted on the eccentric weight at a location on the same side of said axis as said center of gravity whereby at start up the counterweight reduces the eccentricity of the eccentric weight and at operating speeds the counterweight adds to the unbalance of the eccentric weight to increase the vibratory forces generated by the apparatus.

2. Apparatus for increasing the vibratory for generated by a rotating mass comprising:

a rotatably driven shaft have a longitudinal axis;

an eccentric weight mounted rigidly on the shaft, said eccentric weight having a center of gravity spaced a set distance from the longitudinal axis of the shaft to define a radial arm about which the center of gravity operates;

a pivot pin projecting outwardly from said eccentric weight with an axis of the pin lying on the radial arm from the axis of the shaft to the center of gravity of the eccentric weight; and a counterweight freely pivoted on the eccentric weight whereby at start up the counterweight reduces the eccentricity of the eccentric weight and at operating speeds the counterweight adds to the unbalance of the eccentric weight to increase the vibratory forces generated by the apparatus, said counterweight being freely pivotally mounted on said pivot pin to hang freely when the rotation of the shaft is slow and to fly radially outward when the rotation of the shaft is appropriately increased.

3. The apparatus of claim 2 wherein said counterweight has a center of gravity spaced a set distance from the axis of the shaft to define a radial arm for the center of gravity of the counterweight.

4. Apparatus for increasing the vibratory force generated by a rotating mass comprising:

a motor;

a shaft driven by said motor and having a longitudinal axis;

an unbalanced weight member affixed to said shaft for rotation with said shaft, said unbalanced weight member having an enlarged portion on one side of the shaft for creating an eccentric weight member;

pivot means on said weight member located on the same side of said shaft as is the enlarged portion; and a counterweight freely pivoted on said pivot means, said counterweight having an enlarged portion spaced from said pivot means for creating an eccentric weight for said counterweight whereby at start up of the motor the eccentric weight of the counterweight reduces the unbalance of the unbalanced weight member and at operating speeds the eccentric weight of the counterweight adds to the unbalance of the unbalanced weight to increase the vibratory forces generated by the apparatus.

5. The apparatus of claim 4 wherein said weight member has a center of gravity located in the enlarged portion and has a radial arm extending from the longitudinal axis of the shaft to the center of gravity;

a pivot pin projects outwardly from the plane of the weight member and is located on the radial arm between the longitudinal axis of the shaft and the center of gravity; and said counterweight being freely pivotally mounted on said pivot pin to initially reduce vibratory forces generated by said eccentric weight member and to contribute to increased vibratory forces when said motor is up to speed.

6. A vibratory apparatus having a work member supported on isolation means and an exciter member connected to a said work member for imparting a vibratory force to the work member, said exciter member being driven by a rotatably driven shaft, and said exciter member comprising a weight member fixed to said shaft and rotatably driven by said shaft, said weight member having a center of gravity spaced from a longitudinal axis of the shaft to create an unbalance to the weight member which produces a vibratory force when driven by said shaft;

pivot means on the weight member spaced from the axis of the shaft on the same side of the axis of the shaft as the weight member; and a counterweight member freely pivoted on the pivot means and having a center of gravity spaced from the pivot means whereby on initial start up of rotation of the shaft and weight member the weight member will produce a first vibratory motion with the counterweight hanging free on the pivot means and whereby as the shaft reaches the normal set speed the center of gravity of the counterweight member is thrown outward of the axis of the shaft so that the center of gravity of the combination of both the counterweight member and the weight member is moved radially outwardly to produce an increased vibratory motion compared to the vibratory motion produced by the weight member alone.

* * * * *